(12) United States Patent
Lee

(10) Patent No.: US 11,378,832 B2
(45) Date of Patent: Jul. 5, 2022

(54) DISPLAY DEVICE

(71) Applicant: LG ELECTRONICS INC., Seoul (KR)

(72) Inventor: Wanggun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/293,395

(22) PCT Filed: Jul. 29, 2019

(86) PCT No.: PCT/KR2019/009390
§ 371 (c)(1),
(2) Date: May 12, 2021

(87) PCT Pub. No.: WO2020/204271
PCT Pub. Date: Oct. 8, 2020

(65) Prior Publication Data
US 2022/0011620 A1    Jan. 13, 2022

(30) Foreign Application Priority Data

Apr. 1, 2019 (KR) .................. 10-2019-0038079

(51) Int. Cl.
*G02F 1/1333* (2006.01)
*G02F 1/13357* (2006.01)

(52) U.S. Cl.
CPC .. *G02F 1/133308* (2013.01); *G02F 1/133608* (2013.01); *G02F 2201/465* (2013.01)

(58) Field of Classification Search
CPC ......... G02F 1/133308; G02F 1/133608; G02F 2201/465; G02F 1/133325; G02F 1/133314; G02F 1/133322; G02F 1/1336; G06F 1/1601; G06F 1/1637
See application file for complete search history.

(56) References Cited

U.S. PATENT DOCUMENTS 7,027,111 B2   4/2006   Fukayama et al.
8,599,327 B2  12/2013   Fujishima
(Continued)

FOREIGN PATENT DOCUMENTS

| KR | 100715941 | 5/2007 |
|----|-----------|--------|
| KR | 1020120044844 | 5/2012 |
| KR | 1020180026285 | 3/2018 |

OTHER PUBLICATIONS

PCT International Application No. PCT/KR2019/009390, International Search Report dated Jan. 28, 2020, 5 pages.
(Continued)

*Primary Examiner* — Evan P Dzierzynski
(74) *Attorney, Agent, or Firm* — Lee Hong Degerman Kang & Waimey

(57) ABSTRACT

A display device is disclosed. The display device includes a display panel; a light source part disposed behind the display panel and configured to provide light to the display panel; a frame including an accommodation portion accommodating the light source part and an extension extending outward from the accommodation portion; a holder fastened to a rear of the extension; and a back cover surrounding the frame at a rear of the frame, an end of the back cover being coupled to the holder.

8 Claims, 17 Drawing Sheets

(56) References Cited

U.S. PATENT DOCUMENTS

| | | | |
|---|---|---|---|
| 2001/0019377 A1* | 9/2001 | Fukayama | G02F 1/133308 |
| | | | 349/58 |
| 2012/0287368 A1* | 11/2012 | Que | G02B 6/0086 |
| | | | 220/676 |
| 2014/0307196 A1* | 10/2014 | Lin | G02F 1/133308 |
| | | | 349/58 |
| 2016/0223867 A1* | 8/2016 | Kim | G02F 1/133608 |
| 2017/0227808 A1 | 8/2017 | Lee et al. | |
| 2019/0094602 A1 | 3/2019 | Jung et al. | |

OTHER PUBLICATIONS

European Patent Office Application Serial No. 19922359.5, Search Report dated May 24, 2022, 7 pages.

\* cited by examiner

[FIG. 1]
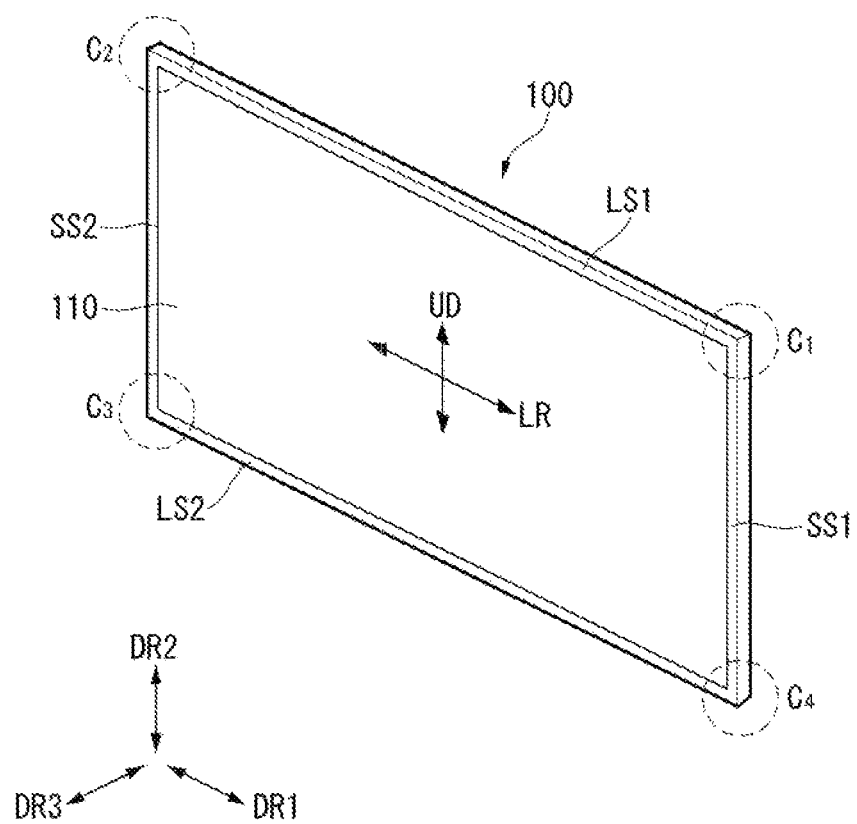

[FIG. 2]
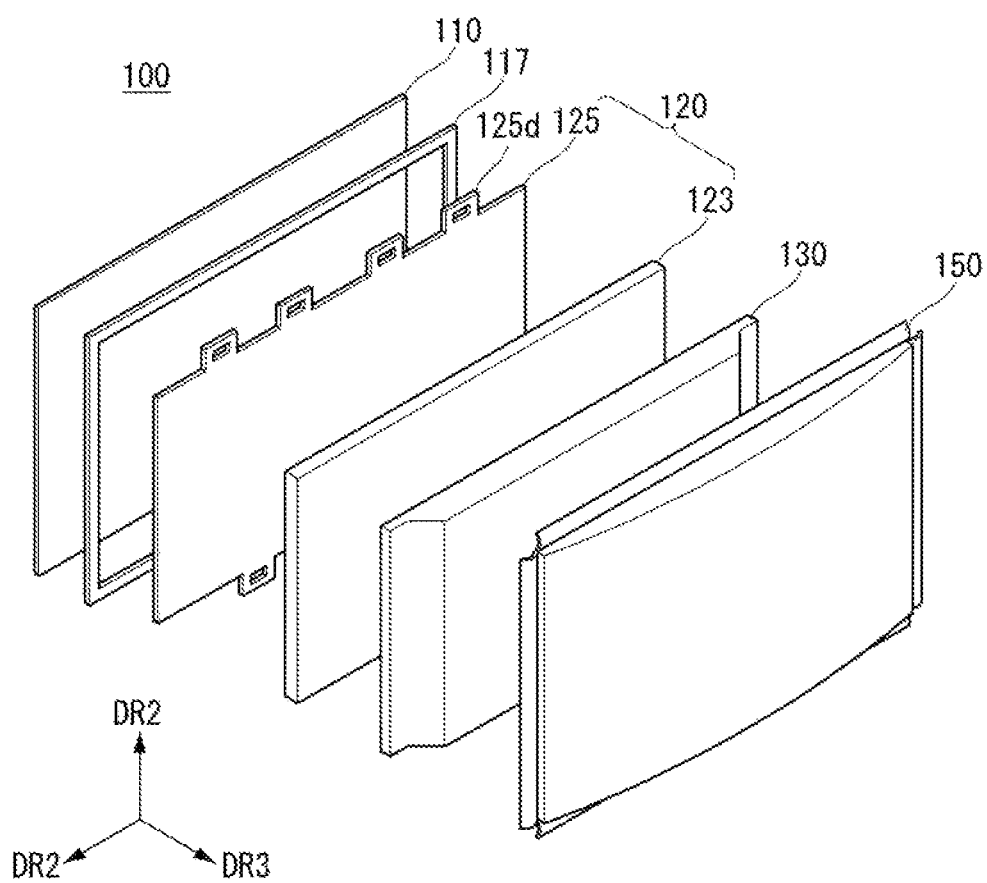

[FIG. 3]
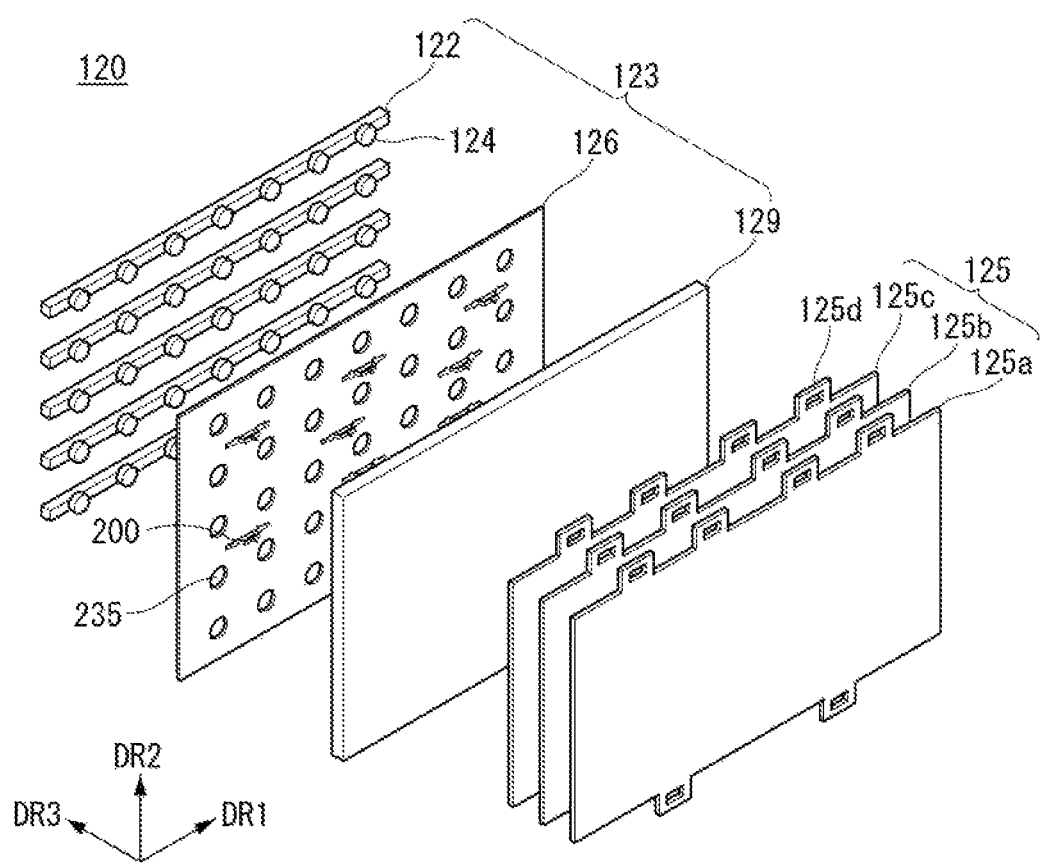

[FIG. 4]
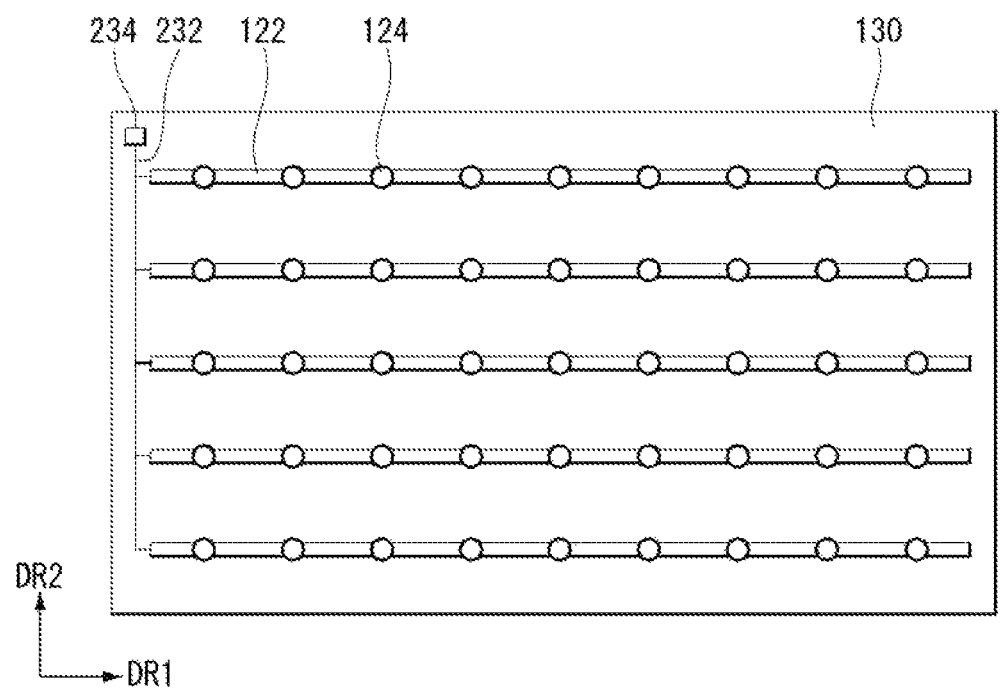

[FIG. 5]
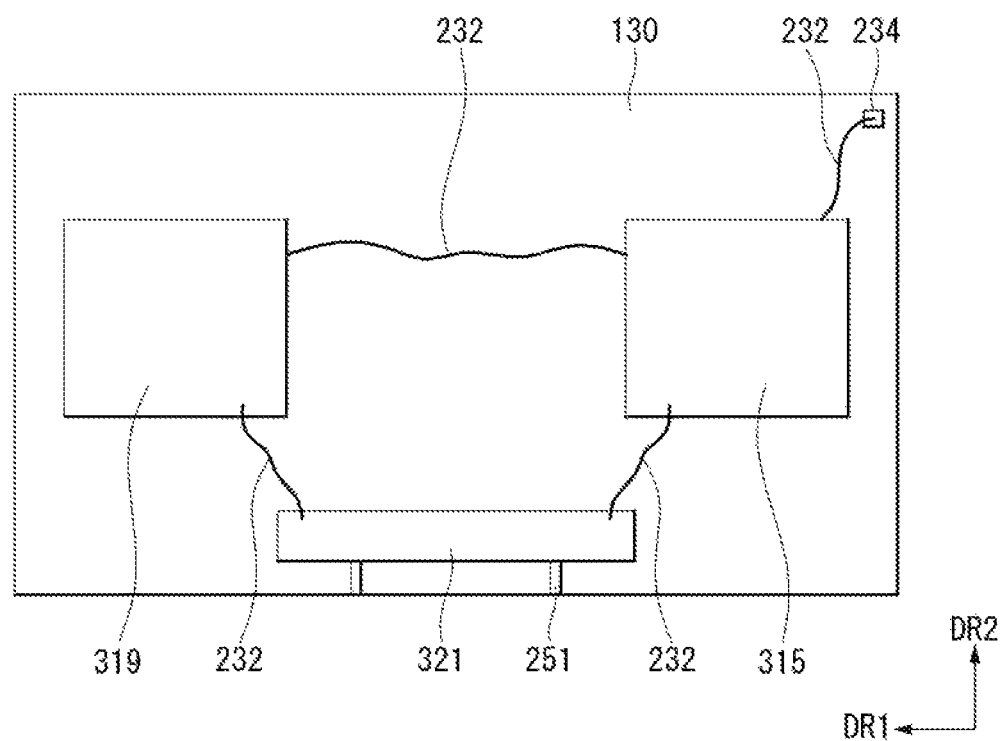

[FIG. 6]
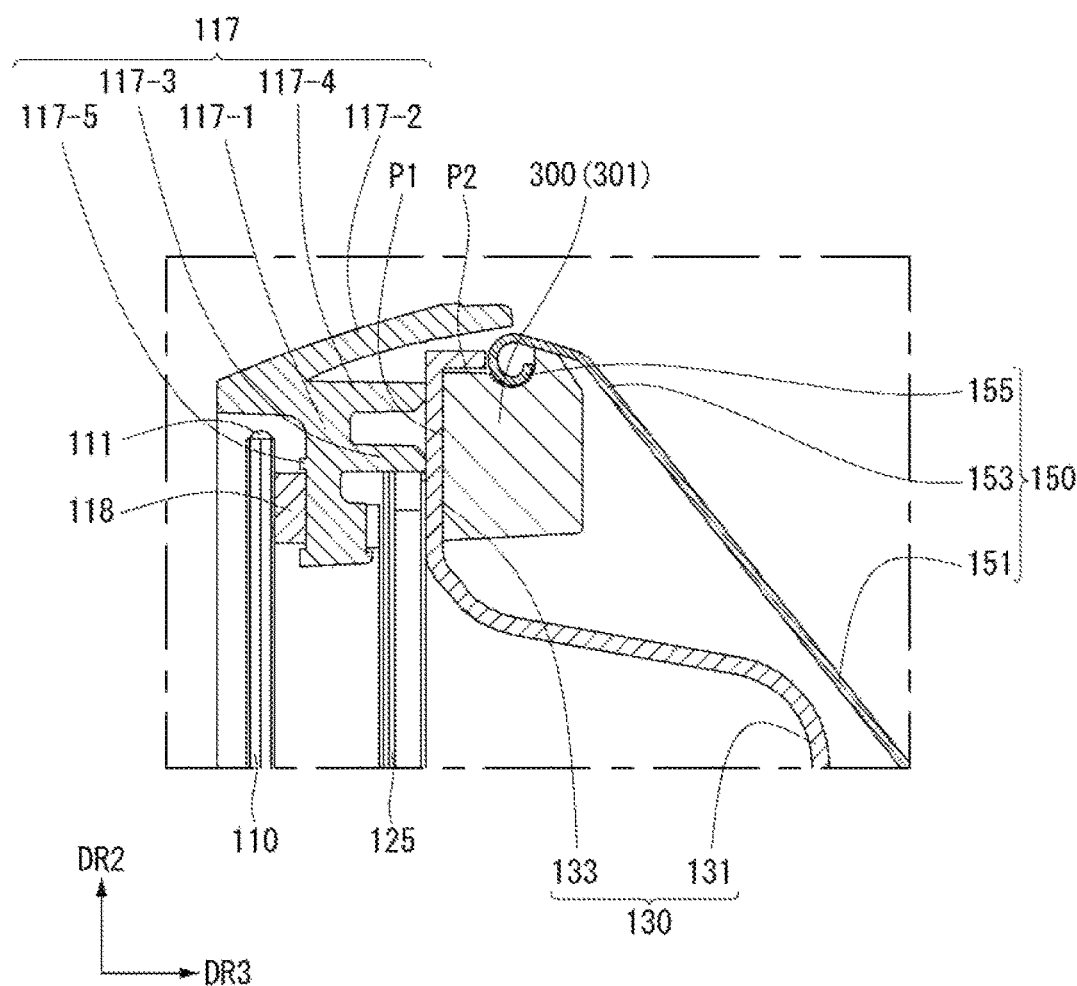

[FIG. 7]
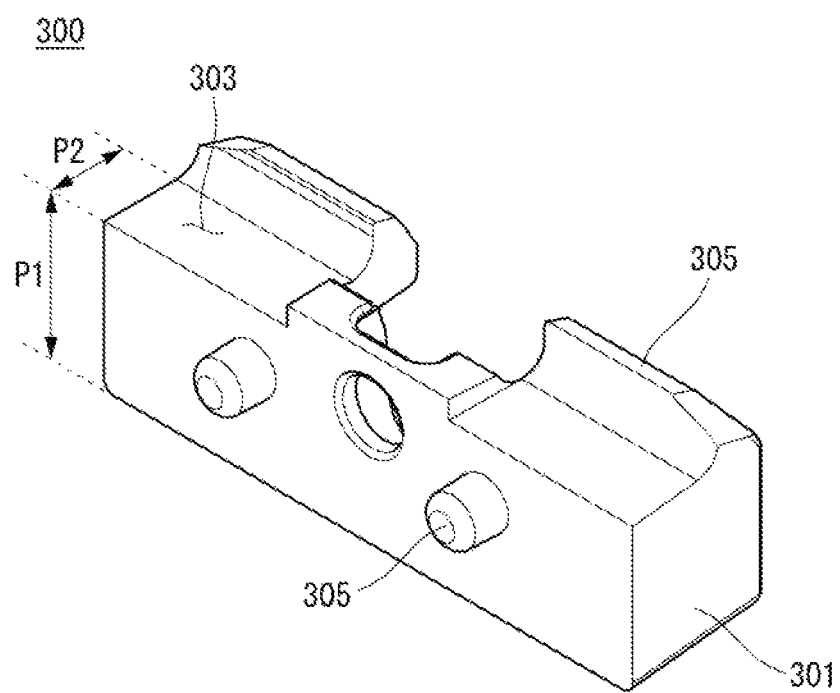

[FIG. 8A]
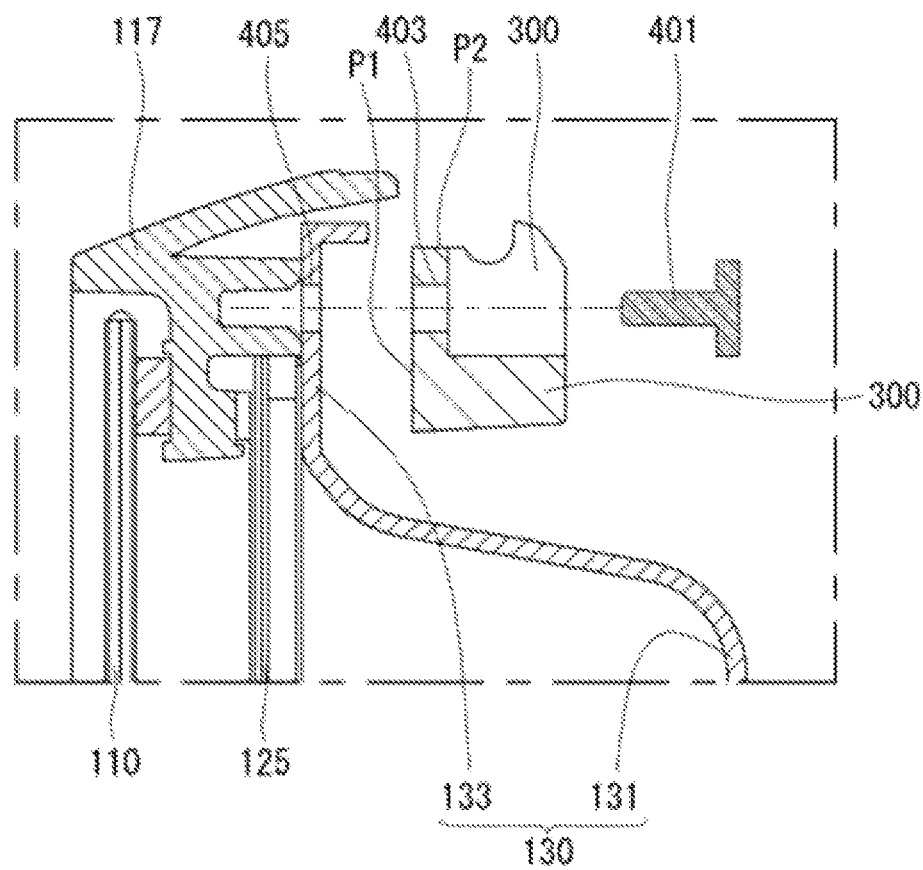

[FIG. 8B]
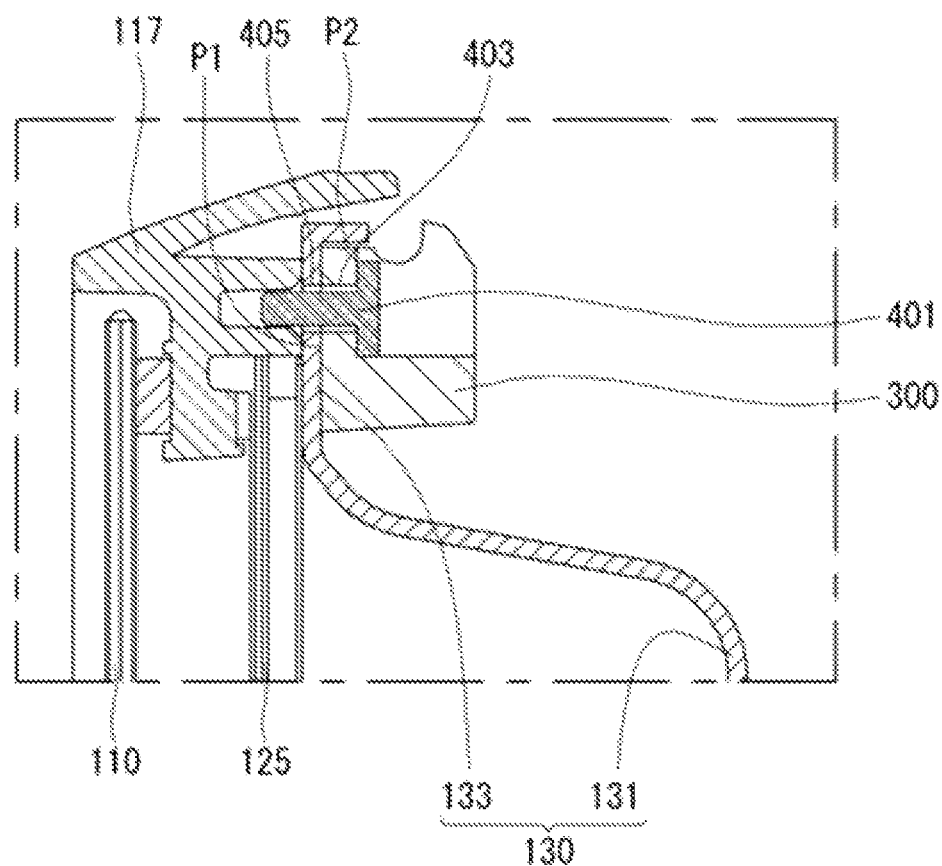

[FIG. 9]
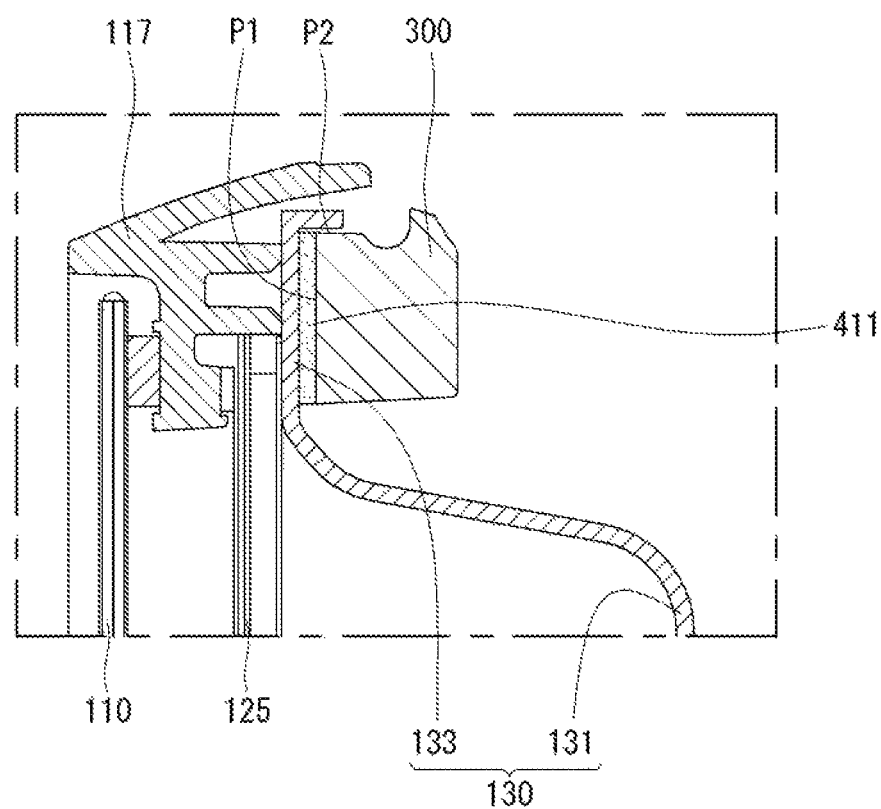

[FIG. 10A]
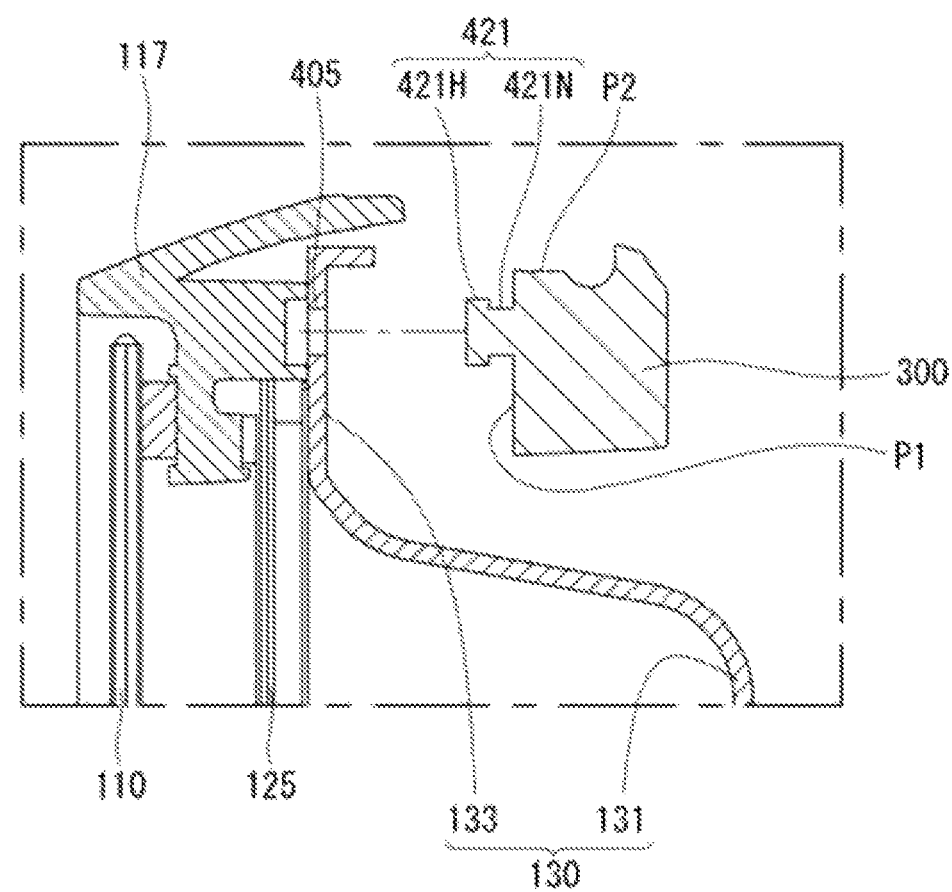

[FIG. 10B]
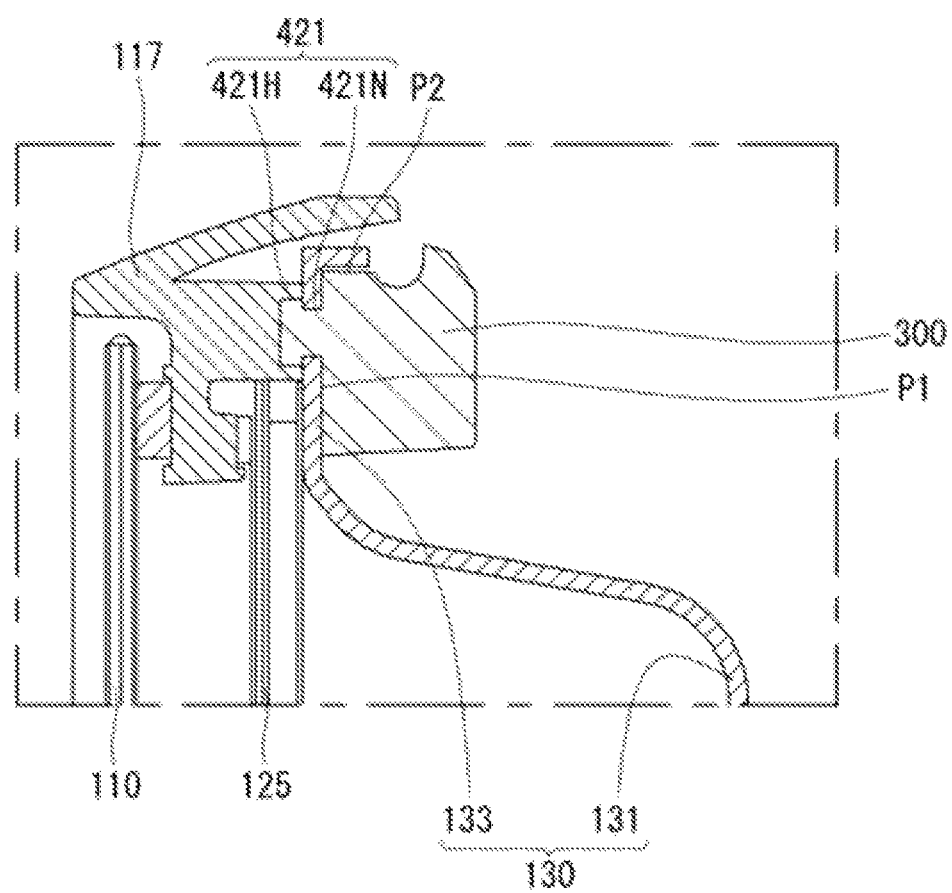

【FIG. 11】
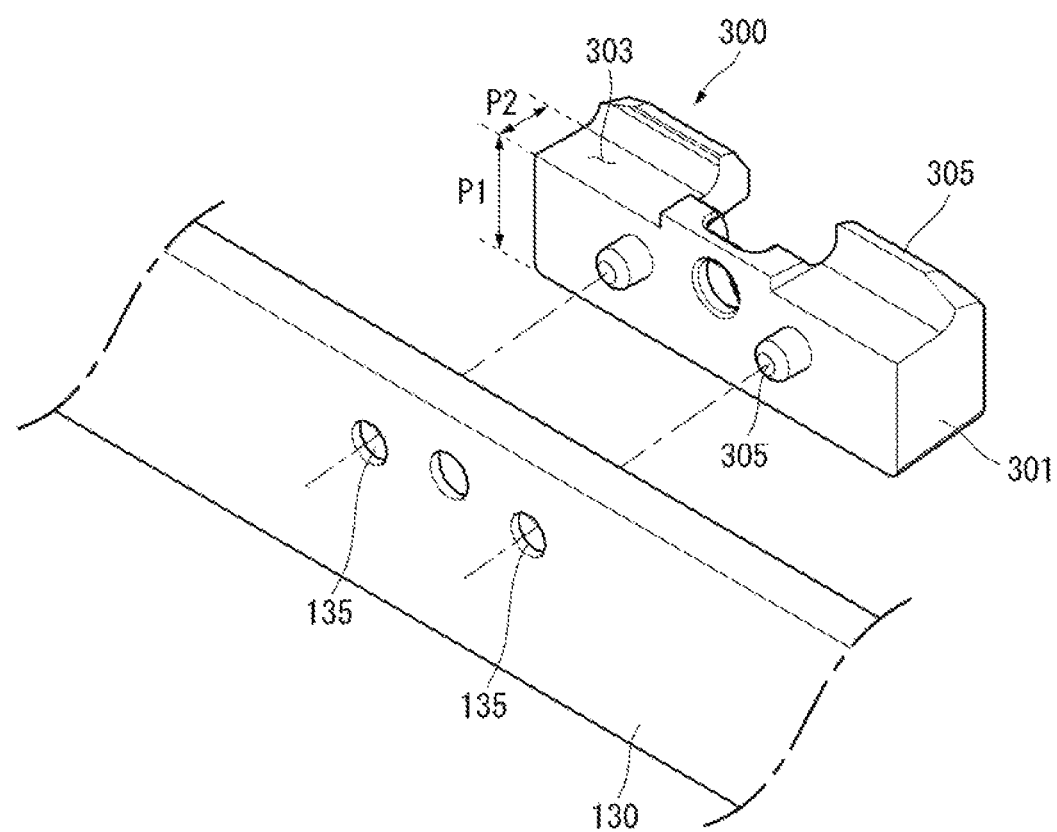

【FIG. 12A】
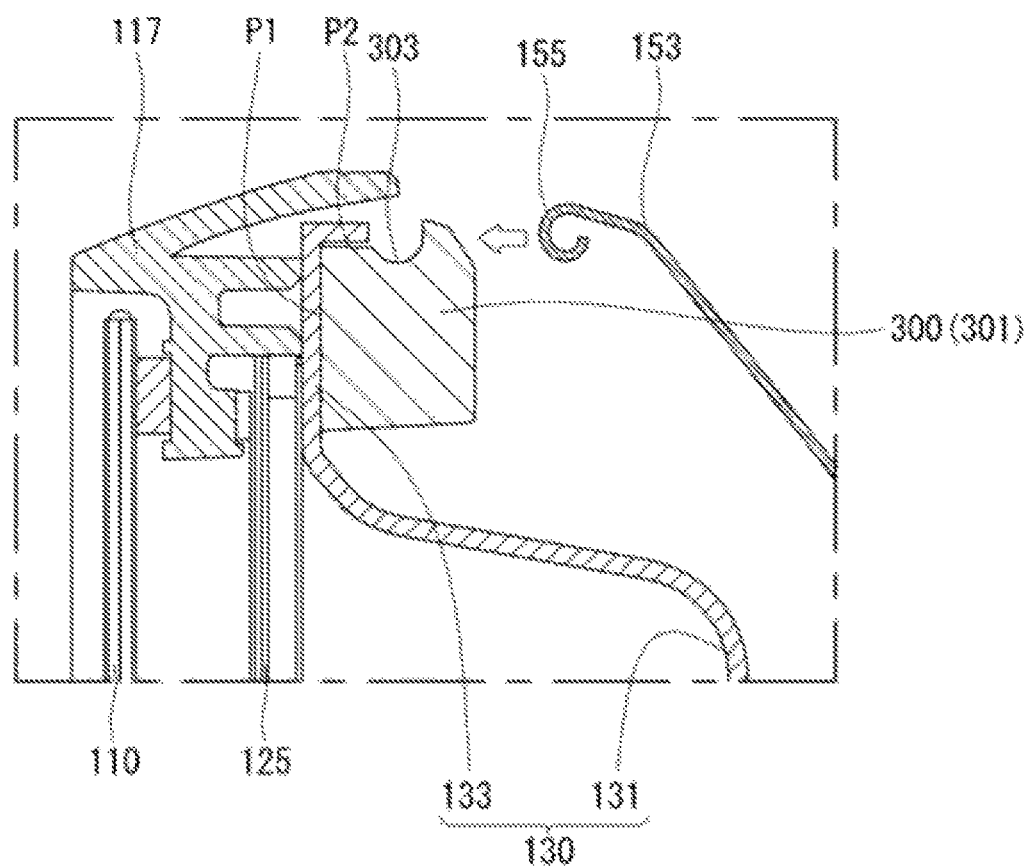

[FIG. 12B]
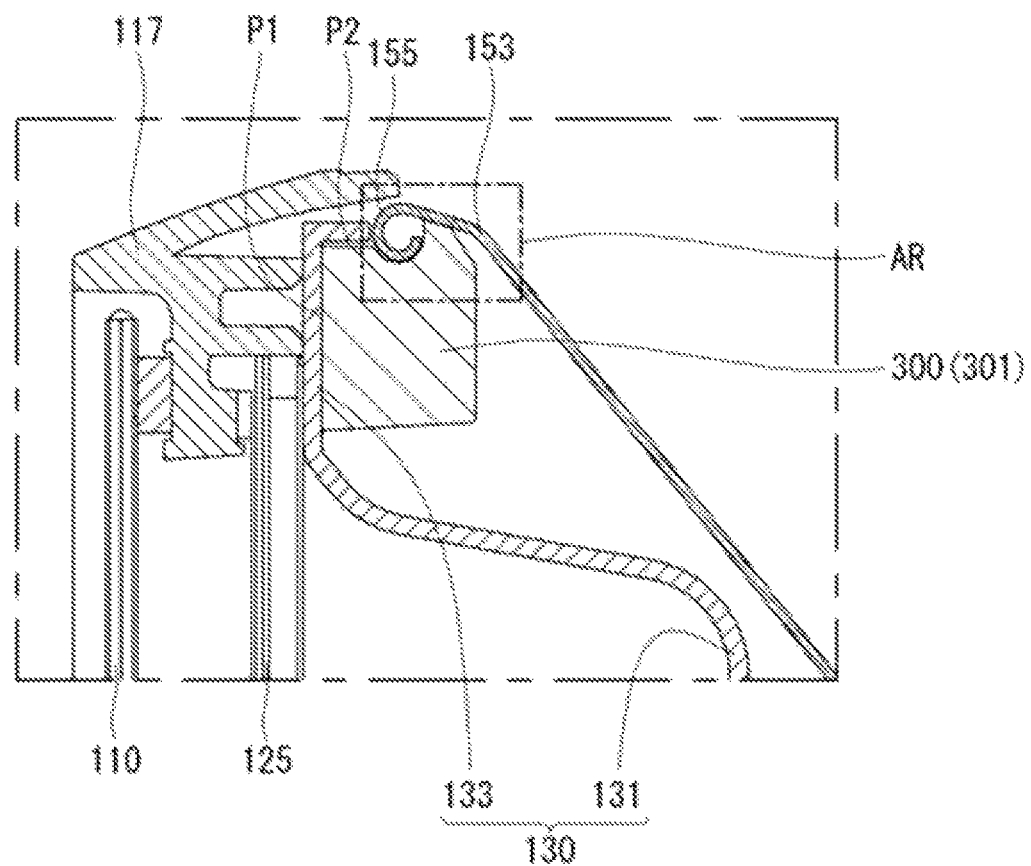

[FIG. 13A]
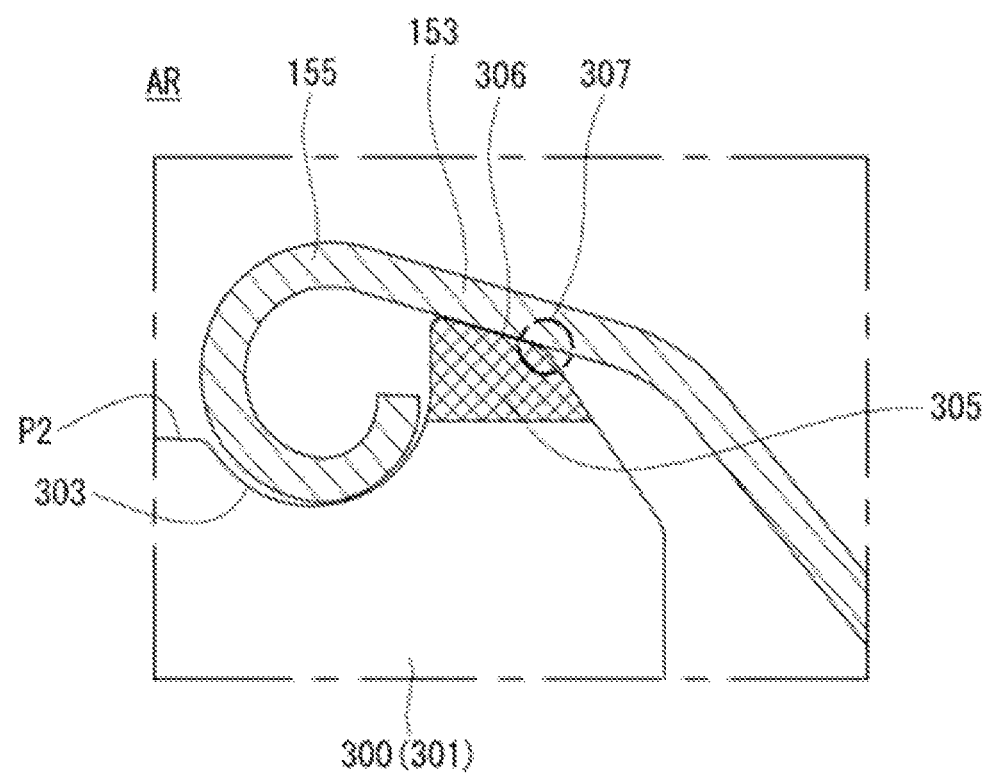

[FIG. 13B]
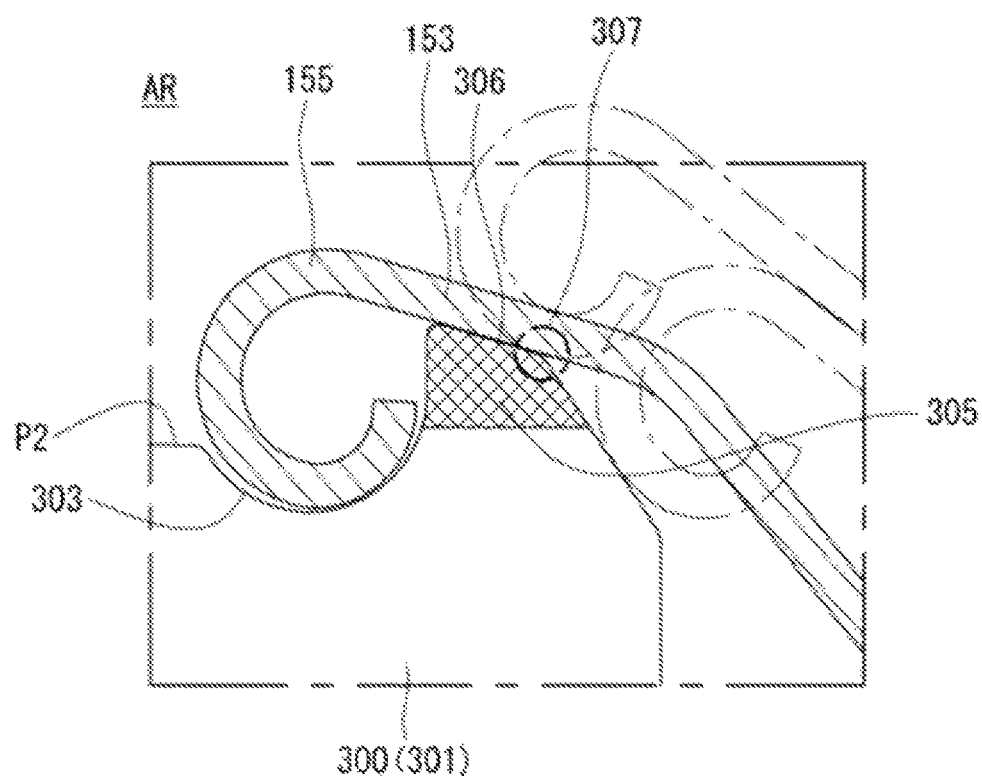

DISPLAY DEVICE

This application is the National Stage filing under 35 U.S.C. 371 of International Application No. PCT/KR2019/009390, filed on Jul. 29, 2019, which claims the benefit of earlier filing date and right of priority Korean Patent Application No. 10-2019-0038079, filed on Apr. 1, 2019, the contents of which are all hereby incorporated by reference herein in their entirety.

TECHNICAL FIELD

The present disclosure relates to a display device.

BACKGROUND ART

With the development of the information society, various types of demands for display devices are increasing. Various display devices such as a liquid crystal display (LCD), a plasma display panel (PDP), an electroluminescent display (ELD), and a vacuum fluorescent display (VFD) have been recently studied and used in response to the various types of demands.

Out of the various display devices, a liquid crystal display panel of the LCD includes a liquid crystal layer and a thin film transistor (TFT) substrate and a color filter substrate that are positioned opposite each other with the liquid crystal layer interposed therebetween. The liquid crystal display panel can display an image using light provided by a backlight unit.

Recently, studies have been actively conducted on improving an assembly structure of a display device while securing rigidity of the display device.

DISCLOSURE

Technical Problem

An object of the present disclosure is to address the above-described and other problems. Another object of the present disclosure is to provide a display device capable of simplifying an assembly process of a case member.

Another object of the present disclosure is to provide a display device with a neat appearance by having a fastening structure so that it is not visually recognized from the outside.

Another object of the present disclosure is to provide a display device including a reflective sheet with a sidewall.

Another object of the present disclosure is to provide a display device capable of strengthening the fastening of a case member.

Another object of the present disclosure is to provide a display device with increased maintenance convenience by using a snap fit structure.

Technical Solution

To achieve the above-described and other objects, in one aspect of the present disclosure, there is provided a display device comprising a display panel; a light source part disposed behind the display panel and configured to provide light to the display panel; a frame including an accommodation portion accommodating the light source part and an extension extending outward from the accommodation portion; a holder fastened to a rear of the extension; and a back cover surrounding the frame at a rear of the frame, an end of the back cover being coupled to the holder.

According to another aspect of the present disclosure, the holder may include a body having a first surface contacting the extension and a second surface extending rearward from an end of the first surface, the body may include a fitting groove provided in the second surface, and the end of the back cover may include a coupling portion that protrudes toward the fitting groove and is coupled to the fitting groove.

According to another aspect of the present disclosure, the coupling portion may be formed by curling the end of the back cover.

According to another aspect of the present disclosure, a curvature forming an outer periphery of the coupling portion may be the same as a curvature forming the fitting groove corresponding to the coupling portion.

According to another aspect of the present disclosure, the back cover may include a base portion covering the rear of the frame; and a connection portion connecting the base portion to the coupling portion, and the body may include a guide portion protruding from the second surface toward the connection portion.

According to another aspect of the present disclosure, the guide portion may include a guide surface facing the connection portion, and at least a portion of the guide surface may contact the connection portion.

According to another aspect of the present disclosure, the guide portion may include a guide surface facing the connection portion, the guide surface may include at least one bent portion that is bent in a predetermined direction, and the predetermined direction may be directed toward an inward direction as the bent portion goes to a rear.

According to another aspect of the present disclosure, the display device may further comprise a screw passing through the body and the extension and fixing the holder and the frame.

According to another aspect of the present disclosure, the holder may include a protrusion that is provided in the first surface of the body and protrudes toward the extension, and the extension may include an open hole into which the protrusion is inserted.

According to another aspect of the present disclosure, a protruding direction of the protrusion may intersect a protruding direction of the coupling portion.

Advantageous Effects

Effects of a display device according to the present disclosure are described as follows.

According to at least one aspect of the present disclosure, the present disclosure can simplify an assembly process of a case member constituting a display device, and thus can increase the manufacturing yield and reduce the manufacturing time and the manufacturing cost.

According to at least one aspect of the present disclosure, the present disclosure can provide a display device with a neat appearance by having a fastening structure so that it is not visually recognized from the outside.

According to at least one aspect of the present disclosure, the present disclosure can further strengthen the fastening of case members by including a protrusion.

According to at least one aspect of the present disclosure, the present disclosure can increase maintenance convenience of a display device by using a snap fit structure.

Further scope of applicability of the present disclosure will become apparent from the detailed description given blow. However, it should be understood that the detailed description and specific examples, while indicating embodiments of the disclosure, are given by illustration only, since various changes and modifications within the spirit and scope of the present disclosure will become apparent to those skilled in the art from this detailed description.

DESCRIPTION OF DRAWINGS

FIGS. 1 to 5 illustrate examples of a display device related to the present disclosure.

FIGS. 6 to 13 illustrate examples of configuration of a display device according to an embodiment of the present disclosure.

MODE FOR INVENTION

Reference will now be made in detail to embodiments of the disclosure, examples of which are illustrated in the accompanying drawings. Wherever possible, the same reference numbers will be used throughout the drawings to refer to the same or like parts.

In the following description, even if an embodiment is described with reference to a specific figure, reference numerals that are not illustrated in the specific figure can be mentioned, and can be used only when the reference numerals that are not illustrated in the specific figure are illustrated in other figures, if necessary or desired.

In the following description, terms such as a first, a second, A, B, (a), (b), upper side, and lower side may be used. These terms are intended to distinguish a component from other components, and the nature, order, sequence, etc., of the corresponding component are not limited by these terms.

In general, a suffix such as "module" and "unit" may be used to refer to the components used in the following description. Use of such a suffix herein is merely intended to facilitate description of the present disclosure, and the suffix itself is not intended to give any special meaning or function.

In addition, when a first component is described as being 'linked', 'coupled', 'fixed', 'fastened', 'contacted', or 'connected' to a second component, it may be understood not only that the first component is directly 'linked', 'coupled', 'fixed', 'fastened', 'contacted', or 'connected' to the second component, but that a third component is 'linked', 'coupled', 'fixed', 'fastened', 'contacted', or 'connected' between the first component and the second component.

It will be noted that a detailed description of known arts will be omitted if it is determined that the detailed description of the known arts can obscure the embodiments of the present disclosure.

The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

In addition, terms such as height, length, and width used in embodiments presented herein may be used and mixed with each other to facilitate description of the present disclosure, and the term itself is not intended to give any special meaning or function.

Hereinafter, embodiments of the present disclosure are described using a liquid crystal display (LCD) panel as an example of a display panel. However, embodiments of the present disclosure are not limited thereto.

Referring to FIG. 1, a display device may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the present disclosure illustrate and describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of a display panel, and a second direction DR2 may be a direction parallel to the short sides SS1 and SS2 of the display panel. Further, a third direction DR3 may be a direction perpendicular to the first direction DR1 and/or the second direction DR2.

The first direction DR1 and the second direction DR2 may be commonly referred to as a horizontal direction. Further, the third direction DR3 may be referred to as a vertical direction.

A side on which the display device displays an image may be referred to as a forward direction or a front side or a front surface. When the display device displays an image, a side at which the image cannot be observed may be referred to as a rearward direction or a rear side or a rear surface. When the display device is observed at the forward direction or the front side or the front surface, the first long side LS1 may be referred to as an upper side or an upper surface. In the same manner, the second long side LS2 may be referred to as a lower side or a lower surface. In the same manner, the first short side SS1 may be referred to as a right side or a right surface, and the second short side SS2 may be referred to as a left side or a left surface.

Further, the first long side LS1, the second long side LS2, the first short side SS1, and the second short side SS2 may be referred to as edges of the display device. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

FIGS. 1 to 5 illustrate examples of a display device related to the present disclosure.

Referring to FIGS. 1 and 2, a display panel 110 may be provided in front of a display device 100 and may display an image. The display panel 110 may include a plurality of pixels and may output the image while controlling hue, brightness and saturation of each pixel.

The display panel 110 may be divided into an active area on which an image is displayed, and an inactive area on which the image is not displayed. The display panel 110 may include a front substrate and a rear substrate that are positioned opposite each other with a liquid crystal layer interposed therebetween.

The front substrate may include a plurality of pixels each including red (R), green (G), and blue (B) subpixels. The front substrate may generate a color corresponding to red, green, or blue color in response to a control signal.

The rear substrate may include switching elements. The rear substrate may switches on or off pixel electrodes. For example, the pixel electrodes may change a molecule arrangement of the liquid crystal layer in response to a control signal received from the outside. The liquid crystal layer may include a plurality of liquid crystal molecules. The arrangement of the liquid crystal molecules may be changed depending on a voltage difference between the pixel electrode and a common electrode. The liquid crystal layer may transfer light provided by a backlight 120 to the front substrate.

A guide panel 117 may be positioned behind the display panel 110. The guide panel 117 may support a part of a rear surface of the display panel 110. The guide panel 117 may contact an outer edge of the display panel 110. The guide panel 117 may be coupled to a frame 130.

The backlight unit 120 may be positioned in the rear of the display panel 110. The backlight unit 120 may include a plurality of light sources. The light sources of the backlight unit 120 may be arranged in an edge type or a direct type. The edge type backlight unit 120 may further include a light guide portion or a light guide panel (LGP)

The backlight unit 120 may be positioned at a front surface of the frame 130. For example, the plurality of light sources may be disposed at the front surface of the frame 130, and the backlight unit may be commonly referred to as a direct type backlight unit.

The backlight unit 120 may be driven in an entire driving method or a partial driving method such as a local dimming method and an impulsive driving method. The backlight unit 120 may include an optical sheet 125 and a light source part 123.

The optical sheet 125 may distribute light of the light sources. The optical sheet 125 may include a plurality of layers. For example, the optical sheet 125 may include at least one prism sheet and/or at least one diffusion sheet.

The optical sheet 125 may include at least one coupling portion 125*d*. Although not shown, the coupling portion 125*d* may be coupled to a back cover 150. That is, the coupling portion 125*d* may be directly coupled to the back cover 150. Alternatively, the coupling portion 125*d* may be coupled to a structure on the back cover 150. That is, the coupling portion 125*d* may be indirectly coupled to the back cover 150. Alternatively, the coupling portion 125*d* may be fixed to the back cover 150 by other components. Alternatively, the coupling portion 125*d* may be omitted. In this case, the optical sheet 125 may be placed by other components and may be fixed at a predetermined location by an adhesive member, etc.

The light source part 123 may include light sources, etc. The light source part 123 will be described in detail later.

The frame 130 may support the components of the display device 100. For example, the components such as the backlight unit 120 may be coupled to the frame 130. The frame 130 may be made of a metal material such as an aluminum alloy.

The back cover 150 may be positioned in the rear of the display device 100. The back cover 150 may protect the internal configuration of the display device 100 from the outside. At least a portion of the back cover 150 may be coupled to the frame 130. The back cover 150 may be an injection of a resin material.

The frame 130 and the back cover 150 may be fixed to each other through at least one fastening structure. The fastening structure of the frame 130 and the back cover 150 will be described in detail later.

Referring to FIG. 3, the backlight unit 120 may include the light source part 123 including a substrate 122, at least one light assembly 124, a reflective sheet 126, and a diffusion plate 129, and the optical sheet 125 positioned in front of the light source part 123. The configuration of the backlight unit 120 is not limited thereto, and one or more of these components may be omitted.

The substrate 122 may be configured in the form of a plurality of straps, which is extended along the first direction and is spaced apart from each other at predetermined intervals in the second direction perpendicular to the first direction.

At least one light assembly 124 may be mounted on the substrate 122. The substrate 122 may have an electrode pattern for connecting an adaptor to the light assembly 124. For example, a carbon nanotube (CNT) electrode pattern may be formed on the substrate 122.

The substrate 122 may be formed of at least one of polyethylene terephthalate (PET), glass, polycarbonate (PC), and silicon. The substrate 122 may be a printed circuit board (PCB).

The light assemblies 124 may be disposed on the substrate 122 at predetermined intervals in the first direction. A diameter of the light assembly 124 may be greater than a width of the substrate 122. That is, the diameter of the light assembly 124 may be greater than a length of the substrate 122 in the second direction.

The light assembly 124 may be a light emitting diode (LED) chip or a LED package including at least one LED chip.

The light assembly 124 may be comprised of a colored LED emitting at least one of red, green, and blue light or a white LED. The colored LED may include at least one of a red LED, a green LED, and a blue LED.

A light source included in the light assembly 124 may be a COB (chip-on board) type. The COB light source may be configured such that an LED chip as the light source is directly coupled to the substrate 122. This configuration can simplify the manufacturing process. Further, this configuration can reduce a resistance, and hence can reduce energy lost as heat. That is, this configuration can increase power efficiency of the light assembly 124. In addition, the COB light source can provide the brighter lighting and can be implemented to be thinner and lighter than the related art.

The reflective sheet 126 may be positioned at a front surface of the substrate 122. The reflective sheet 126 may have holes 235, and the light assemblies 124 may be inserted into the holes 235.

The reflective sheet 126 may reflect light provided from the light assembly 124 to the front. Further, the reflective sheet 126 may again reflect light reflected from the diffusion plate 129 toward the diffusion plate 129.

The reflective sheet 126 may include at least one of metal and metal oxide, each of which is a reflection material. The reflective sheet 126 may include metal and/or metal oxide with a high reflectance, for example, at least one of aluminum (Al), silver (Ag), gold (Au), and titanium dioxide ($TiO_2$).

The reflective sheet 126 may be formed by depositing and/or coating metal or metal oxide on the substrate 122. An ink including a metal material may be printed on the reflective sheet 126. The reflective sheet 126 may include a deposition layer formed using a heat deposition method, an evaporation method, or a vacuum deposition method such as a sputtering method. The reflective sheet 126 may include a coating layer and/or a printing layer formed using a printing method, a gravure coating method or a silk screen method.

An air gap may be positioned between the reflective sheet 126 and the diffusion plate 129. The air gap may serve as a buffer capable of widely spreading light emitted from the light assembly 124. To keep the air gap, a supporter 131 may be positioned between the reflective sheet 126 and the diffusion plate 129.

A resin may be deposited on the light assembly 124 and/or the reflective sheet 126. The resin may diffuse light emitted from the light assembly 124. The diffusion plate 129 may upwardly diffuse light emitted from the light assembly 124.

The optical sheet 125 may be positioned in front of the diffusion plate 129. A rear surface of the optical sheet 125 may face the diffusion plate 129, and a front surface of the optical sheet 125 may face the rear surface of the display panel 110.

The optical sheet 125 may include at least one sheet. More specifically, the optical sheet 125 may include one or more prism sheets and/or one or more diffusion sheets. A plurality of sheets included in the optical sheet 125 may be in an adhesive and/or adhered state.

The optical sheet 125 may be comprised of a plurality of sheets having different functions. For example, the optical sheet 125 may include first to third optical sheets 125a to 125c. The first optical sheet 125a may function as a diffusion sheet, and the second and third optical sheets 125b and 125c may function as a prism sheet. The number and/or position of the diffusion sheets and the prism sheets may be changed.

The diffusion sheet can prevent light coming from the diffusion plate from being partially concentrated and can more uniformly distribute light. The prism sheet can concentrate light coming from the diffusion sheet and can allow light to be vertically incident on the display panel 110.

The coupling portion 125d may be formed on at least one of one side or an edge of the optical sheet 125. The coupling portion 125d may be formed on at least one of the first to third optical sheets 125a to 125c.

The coupling portion 125d may be formed at a long side or an edge of the optical sheet 125. The coupling portion 125d on a first long side and the coupling portion 125d on a second long side may be asymmetric. For example, the number and/or position of the coupling portions 125d on the first long side may be different from the number and/or position of the coupling portions 125d on the second long side.

Referring to FIG. 4, the substrate 122 configured in the form of the plurality of straps, which is extended along the first direction and is spaced apart from each other at predetermined intervals in the second direction perpendicular to the first direction, may be provided on the frame 130. One side of each of the plurality of substrates 122 may be connected to a wire electrode 232.

The wire electrode 232 may be extended along the second direction. The wire electrode 232 may be connected to one side of the substrate 122 at a predetermined distance in the second direction.

A wire hole 234 may be formed at one end of the wire electrode 232. The wire hole 234 may be a fine hole passing through the frame 130. The wire electrode 232 may be extended to a rear surface of the frame 130 through the wire hole 234. The wire electrode 232 may be electrically connected to an adaptor (not shown) positioned at the rear surface of the frame 130 through the wire hole 234.

The light assemblies 124 may be mounted on the substrate 122 at predetermined intervals in the first direction. A diameter of the light assembly 124 may be greater than a width of the substrate 122 in the second direction.

Referring to FIG. 5, the wire electrode 232 extended from the front surface of the frame 130 through the wire hole 234 may be electrically connected to a power supply 315. The power supply 315 may be a printed circuit board supplying electric power to the display device 100. The power supply 315 may convert AC power into DC power.

The power supply 315 may supply electric current to the light assembly 124 through the wire electrode 232. The power supply 315 may be electrically connected to a main board 321 through the wire electrode 232. The main board 321 may be spaced apart from the power supply 315 by a predetermined distance.

The main board 321 may be a printed circuit board providing an interface for operating the display device 100. Further, the main board 321 may check and manage an operation state of the respective components of the display device 100.

The power supply 315 and the main board 321 may be electrically connected to a timing controller (T-CON) board 319 through the wire electrode 232. The timing controller board 319 may be a printed circuit board transmitting electric power or signals input from the power supply 315 or the main board 321 to the display panel 110. The timing controller board 319 may be electrically connected to the display panel 110 positioned at the front surface of the frame 130 through a flat flexible cable 251.

FIG. 5 illustrates that the printed circuit boards are connected to each other, by way of example. However, embodiments are not limited thereto. For example, only at least a portion of each printed circuit board may be connected to one another.

FIGS. 6 to 13 illustrate examples of configuration of a display device according to an embodiment of the present disclosure.

Referring to FIGS. 6 to 7, a display device according to an embodiment of the present disclosure may include a display panel 110 and a backlight unit 120 disposed below the display panel 110. As described above, the display panel 110 may include a front substrate and a rear substrate that are positioned opposite to each other, and a liquid crystal layer interposed between the front substrate and the rear substrate. The liquid crystal layer may be implemented in at least one of various liquid crystal modes. A polarizing film may be further provided on each of an upper surface and a rear surface of the display panel 110.

In order to protect the side of the display panel 110 and prevent a light leakage failure, a sealing material 111 covering the side of the display panel 110 may be coated. A sealing resin may consist of oligomer, monomer, photo-initiator, additives, etc., but embodiments are not limited thereto.

The backlight unit 120 may be provided behind the display panel 110 and may irradiate light onto the display panel 110. The backlight unit 120 may include an optical sheet 125 and a light source part 123. Light provided by the light source part 123 may be uniformly irradiated onto the display panel 110 while passing through the optical sheet 125.

The backlight unit 120 and the display panel 110 may be assembled together by case members and implemented as a liquid crystal module.

The case member according to an embodiment of the present disclosure may include case members such as a guide panel 117, a frame 130, and a back cover 150, and a bracket 300 for mutually fixing the frame 130 and the back cover 150. The bracket 300 may be referred to as a holder 300.

The guide panel 117 may include a horizontal portion 117-1 and a vertical portion 117-2. The horizontal part 117-1 may support an edge of the display panel 110 at the rear. The horizontal part 117-1 is provided between the display panel 110 and the optical sheet 125, and thus can uniformly maintain a distance between the display panel 110 and the optical sheet 125 according to optical characteristics.

The display panel 110 and the guide panel 117 may be fixed to each other by an adhesive layer 118. The adhesive layer 118 may be interposed between the edge of the display panel 110 and the horizontal portion 117-1 of the guide panel 117. The adhesive layer 118 may perform a function of constraining and restricting a mutual movement of the display panel 110 and the guide panel 117 and a function of buffering an external force provided. Further, the adhesive layer 118 may include a light blocking material to prevent light from leaking to the edge of the display panel 110, thereby serving as a light blocking member. In order to prevent separation of the adhesive layer 118, one or more protrusions 117-5 may be provided on the horizontal portion 117-1. That is, the protrusions 117-5 are disposed on at least one side of the adhesive layer 118 and may serve as a stopper.

The vertical portion 117-2 may extend from one side of the horizontal portion 117-1. The vertical portion 117-2 may be elongated and disposed to cover the side of the display panel 110. In addition, the vertical portion 117-2 may be elongated and disposed to cover at least a portion of the frame 130 and the bracket 300 to be described later. In this case, since the frame 130 and the bracket 300 are not exposed by the vertical portion 117-2, they may not be visually recognized from the outside.

The guide panel 117 may further include one or more ribs 117-3 and 117-4. The ribs 117-3 and 117-4 may extend toward the frame 130 from the horizontal portion 117-1. The ribs 117-3 and 117-4 may be mounted on the frame 130, in particular, an extension 133 of the frame 130.

The frame 130 may include an accommodation portion 131 and an extension 133. The accommodation portion 131 may accommodate the components of the display device. For example, the accommodation portion 131 may provide an inner space capable of accommodating the light source part 123. The extension 133 may extend outwardly from at least one side of the accommodation portion 131. If necessary or desired, the extension direction of the extension 133 may be referred to as a horizontal direction, a left-right direction, or a lateral direction.

The back cover 150 may determine an appearance of the rear surface of the display device. To this end, the back cover 150 may be disposed to surround the frame 130 at the rear of the frame 130. The back cover 150 may be connected to the frame 130 through the bracket 300, and its movement may be constrained and restricted within a predetermined range. That is, the back cover 150 may be fixed to the frame 130 via the bracket 300.

More specifically, the bracket 300 may be disposed in an inner space provided between the frame 130 and the back cover 150. The bracket 300 may include a body 301 with a predetermined shape. The body 301 includes at least a first surface P1 and a second surface P2. That is, the first surface P1 and the second surface P2 may refer to predetermined different surfaces among surfaces that determine an appearance of the body 301.

The first surface P1 of the body 301 may be a surface facing the extension 133 of the frame 130. That is, the first surface P1 may be a surface facing a rear surface of the extension 133. Alternatively, the first surface P1 may be a surface that contacts at least a portion of the rear surface of the extension 133. When the extension 133 contacts face-to-face with the bracket 300 as described above, it may be easy to maintain a state in which the extension 133 is seated on the first surface P1 of the body 301. The first surface P1 may be referred to as an upper surface of the body 301.

The bracket 300 and the frame 130 are fixed to each other through a predetermined fastening structure.

For example, referring to FIGS. 8A and 8B, the frame 130 and the bracket 300 may be fixed to each other through at least one screw 401. For example, the body 301 of the bracket 300 and the extension 133 of the frame 130 may respectively include a first screw hole 403 and a second screw hole 405 that are opened along one direction. The bracket 300 and the frame 130 may be fixed to each other through the screw 401 fastened to the first screw hole 403 and the second screw hole 405. The fastening direction of the screw 401 may be a vertical direction intersecting the extension direction of the extension 133.

As another example, referring to FIG. 9, the frame 130 and the bracket 300 may be fixed to each other through an adhesive member 411 interposed between the extension 133 of the frame 130 and the body 301 of the bracket 300. The adhesive member 411 may be a double-sided tape, but is not limited thereto. One surface of the adhesive member 411 may be attached to the rear surface of the extension 133, and other surface of the adhesive member 411 may be attached to the first surface P1 of the body 301.

As another example, referring to FIGS. 10A and 10B, the frame 130 and the bracket 300 may be fixed to each other through a fitting coupling structure. The bracket 300 may include at least one fixing pin 421, and the extension 133 of the frame 130 may include a pin hole 423. For example, the fixing pin 421 may have a shape protruding from the first surface P1 of the body 301 toward the extension 133. The fixing pin 421 may include a pin head 421H and a pin neck 421N. Each of the pin head 421H and the pin neck 421N may have a cylindrical shape having a different diameter. That is, the pin neck 421N may extend from the first surface P1 of the body 301 and may have a cylindrical shape having a first diameter. The pin head 421H may extend from the pin neck 421N and may have a cylindrical shape having a second diameter larger than the first diameter. A diameter of the pin hole 423 may be set to be greater than or equal to the first diameter, but may be set to be less than the second diameter. The bracket 300 may be formed of a material with a predetermined softness. Thus, when a predetermined external force is provided, the pin head 421H may pass through the pin hole 423. Thereafter, since the movement of the pin head 421H through the pin hole 423 is restricted, the frame 130 and the bracket 300 may be kept fixed to each other.

Referring to FIG. 11, the bracket 300 may further include at least one protrusion 305. The extension 133 of the frame 130 may include an open hole 135 into which the protrusion 305 is inserted. The number of protrusions 305 may correspond to the number of open holes 135. As the protrusion 305 is inserted into the open hole 135, a relative rotational motion (or twist) of the bracket 300 and the frame 130 may be restricted. Hence, there is an advantage in that the movement of the frame 130 and the bracket 300 can be more effectively constrained. Here, an extension direction of the protrusion 305 may be a direction perpendicular to the extension direction of the extension 133.

Referring again to FIGS. 6 and 7, the second surface P2 of the body 301 may be a surface extending from one side of the first surface P1 toward the rear. An angle formed by the first surface P1 and the second surface P2 may be a dutch angle or a tilt angle. The second surface P2 may be a surface that contacts at least a portion of one end of the back cover 150. The second surface P2 may be referred to as a side surface of the body 301.

The body 301 may include a fitting groove 303. The fitting groove 303 may be provided corresponding to the second surface P2 of the body 301. The fitting groove 303 may be provided in a shape in which the second surface P2 of the body 301 is partially recessed inward.

The back cover 150 may include a base portion 151, a connection portion 153, and a coupling portion 155. The base portion 151 may cover the rear surface of the frame 130. The connection portion 153 is a bent portion of the back cover 150 and may extend from one end of the base portion 151. The connection portion 153 may cover at least a portion of the second surface P2 of the body 301. The coupling portion 155 may protrude inward from one end of the connection portion 153 toward the bracket 300. A shape of the coupling portion 155 may correspond to the shape of the fitting groove 303.

The coupling portion 155 may be inserted into the fitting groove 303. Hence, the mutual movement of the back cover 150 and the bracket 300 may be restricted and constrained. That is, the bracket 300 and the back cover 150 may be fastened through a snap fit structure using the coupling portion 155 and the fitting groove 303. A protruding direction of the coupling portion 155 may be a horizontal direction intersecting the fastening direction of the screw 401 and/or the extension direction of the protrusion 305.

Since the fitting groove 303 and the coupling portion 155 which are used in the fastening structure of the bracket 300 and the back cover 150 are not visually recognized from the outside, there is an advantage in that a display device with a neat appearance can be provided. In addition, since the process can be simplified by using the snap fit structure, there is an advantage in that the manufacturing yield can increase, and the manufacturing time and manufacturing cost can be reduced. In addition, by using the snap fit structure, there is an advantage of increasing the convenience of maintenance.

More specifically, referring to FIGS. 12A, 12B, 13A and 13B together with FIG. 7, the back cover 150 may be fastened to the bracket 300 fixed to the frame 130. Hence, the back cover 150 may be fixed to the frame 130 by means of the bracket 300.

The coupling portion 155 of the back cover 150 may be inserted into the fitting groove 303 provided in the body 301 of the bracket 300. The coupling portion 155 may have a curling shape in which one end of the back cover 150 is rolled round. In this case, since the rigidity of the coupling portion 155 can be improved, there is an advantage in that damage to the coupling portion 155 can be prevented during fitting coupling.

The fitting groove 303 may have a shape corresponding to the shape of the coupling portion 155. For example, when the coupling portion 155 has the curling shape, curvature forming an outer shape of the curling shape and curvature of the fitting groove 303 may correspond to each other. That is, the curvature forming the outer periphery of the coupling portion 155 and the curvature of the fitting groove 303 that contacts the coupling portion 155 to correspond thereto may be the same as each other. In this case, the coupling portion 155 may be firmly fastened to the fitting groove 303. Hence, since a clearance between the coupling portion 155 and the fitting groove 303 can be minimized, damage and noise due to the clearance between the coupling portion 155 and the fitting groove 303 can be prevented.

The bracket 300 may further include a guide portion 305. The guide portion 305 may extend from the second surface P2 of the body 301 and may have a shape protruding toward the connection portion 153 of the back cover 150. The guide portion 305 may serve as a stopper that prevents the coupling portion 155 inserted into the fitting groove 303 from being separated from a predetermined fixed position.

The guide portion 305 may include a guide surface 306 facing the connection portion 153 of the back cover 150. At least a portion of the guide surface 306 may contact face-to-face with the connection portion 153 of the back cover 150. In this case, the back cover 150 may be stably seated at the proper position of the bracket 300.

When the back cover 150 and the bracket 300 are assembled, the guide surface 306 may guide a movement path of the coupling portion 155. To this end, the guide surface 306 may have a bent portion 307. The bent portion 307 may extend toward the inward direction as it goes to the rear. In other words, the bent portion 307 may be bent more than once in a predetermined direction, and the predetermined direction may be directed toward the inward direction as it goes to the rear. The bent portion 307 is not limited to the illustrated structure, and may have a multi-bending structure, if necessary. In this case, in the process of fastening the bracket 300 and the back cover 150, there is an advantage in that the coupling portion 155 can be fitted and coupled to the fitting groove 303 with a relatively small force. In addition, since the external force provided is reduced, there is an advantage of preventing damage to the bracket 300 and the back cover 150.

Certain embodiments or other embodiments of the present disclosure described above are not mutually exclusive or distinct from each other. Some embodiments or other embodiments of the present disclosure described above may be combined with each other in configuration or function.

The above detailed description is merely an example and is not to be considered as limiting the present disclosure. The scope of the present disclosure should be determined by rational interpretation of the appended claims, and all changes within the equivalent range of the present disclosure are included in the scope of the present disclosure.

The invention claimed is:
1. A display device comprising:
a display panel;

a light source part disposed behind the display panel and configured to provide light to the display panel;

a frame including an accommodation portion accommodating the light source part and an extension extending outward from the accommodation portion;

a holder fastened to a rear of the extension; and a back cover surrounding the frame at a rear of the frame, an end of the back cover being coupled to the holder, wherein the holder includes a body having a first surface contacting the extension and a second surface extending rearward from an end of the first surface, wherein the body includes a fitting groove provided in the second surface, wherein the end of the back cover includes a coupling portion that protrudes toward the fitting groove and is coupled to the fitting groove, and wherein the coupling portion is formed by curling the end of the back cover.

2. The display device of claim 1, wherein a curvature forming an outer periphery of the coupling portion is the same as a curvature forming the fitting groove corresponding to the coupling portion.

3. The display device of claim 1, wherein the back cover includes:

a base portion covering the rear of the frame; and a connection portion connecting the base portion to the coupling portion, wherein the body includes a guide portion protruding from the second surface toward the connection portion.

4. The display device of claim 3, wherein the guide portion includes a guide surface facing the connection portion, wherein at least a portion of the guide surface contacts the connection portion.

5. The display device of claim 3, wherein the guide portion includes a guide surface facing the connection portion, wherein the guide surface includes at least one bent portion that is bent in a predetermined direction, wherein the predetermined direction is directed toward an inward direction as the bent portion goes to a rear.

6. The display device of claim 1, further comprising a screw passing through the body and the extension and fixing the holder and the frame.

7. The display device of claim 1, wherein the holder includes a protrusion that is provided in the first surface of the body and protrudes toward the extension, wherein the extension includes an open hole into which the protrusion is inserted.

8. The display device of claim 7, wherein a protruding direction of the protrusion intersects a protruding direction of the coupling portion.

* * * * *